Aug. 17, 1943.                W. C. BUCKNAM                2,326,825
                         ALTITUDE-CONTROLLED REGULATOR
                             Filed Nov. 19, 1940

INVENTOR
WORTHY C. BUCKNAM
BY
ATTORNEY

Patented Aug. 17, 1943

2,326,825

UNITED STATES PATENT OFFICE 2,326,825

ALTITUDE-CONTROLLED REGULATOR

Worthy C. Bucknam, Mechanic Falls, Maine, assignor to Union Carbide and Carbon Corporation, a corporation of New York Application November 19, 1940, Serial No. 366,246

5 Claims. (Cl. 137—153)

This invention relates to apparatus for supplying oxygen in the high altitude operation of aircraft and similar purposes, and more particularly to an altitude-controlled regulator for automatically varying the rate of flow of oxygen supplied in accordance with variations in atmospheric pressure.

In high altitude flying, additional oxygen generally must be supplied to the occupants of aircraft due to the increased rarity of the atmosphere. The additional amount of oxygen required is substantially proportional to the altitude at which the aircraft is flying. As both space and weight are at a premium in aircraft, the bulk and weight of the oxygen supply and associated regulating apparatus must be kept as small as possible. For this reason, the oxygen supply usually is contained in cylinders in which the oxygen is compressed under relatively high pressure. In order to relieve the operator of the aircraft from the necessity of controlling the supply of oxygen in accordance with changes in altitude, it has hitherto been proposed to use automatic apparatus for supplying varying quantities of oxygen to the interior of the aircraft in accordance with changes in altitude, which changes are reflected in corresponding changes in the atmospheric pressure.

For this purpose, altitude-controlled regulators and valves have been provided for producing variations in the flow of oxygen in accordance with changes in altitude. While devices used heretofore have been provided with manual adjustment means in addition to the automatic altitude or atmospheric pressure-responsive means, the relation existing between the rate of flow and the altitude was usually an inherent characteristic of the completed regulator and could not be altered quickly and easily. Furthermore, such devices have usually been expensive because they have been designed to reduce the oxygen pressure from around 100 lbs. per sq. in. down to the relatively low value required for human consumption at high altitudes.

It is therefore among the objects of this invention to provide an inexpensive altitude-controlled regulator with a manual adjustment means for changing the rate of flow of oxygen from the regulator without affecting the equation representing the relationship between the rate of oxygen flow and the altitude; to provide an altitude-controlled regulator wherein the mathematical relationship between the rate of oxygen flow and the atmospheric pressure or altitude may be altered easily; to provide an inexpensive altitude-controlled regulator for individual service, wherein one or more of said regulators may be supplied from a conventional absolute pressure-controlled regulator which is substantially insensitive to changes in atmospheric pressure; to provide a simple, inexpensive, compact and lightweight altitude-controlled regulator wherein the flow of oxygen may be made to begin at any desired altitude and the rate of flow at any given altitude may be altered at will; and to provide an improved oxygen supply system that is efficient and effective at high altitudes.

These and other objects of the invention will in part be obvious and in part become apparent from the following description and the accompanying drawing, in which.

Generally speaking, the invention contemplates the provision of an oxygen supply system including a source of oxygen under high pressure, means for reducing such high pressure to an intermediate value, and a plurality of altitude or atmospheric pressure means for varying the rate of flow of oxygen to consumption devices in accordance with changes in atmospheric pressure or altitude. The atmospheric pressure-responsive means may include a regulator having a valving orifice and means displaceable axially through the orifice to vary the effective area of the orifice. The displaceable means may be readily interchangeable with other displaceable means to vary the mathematical relationship between the rate of flow of oxygen and the altitude or atmospheric pressure.

Figure 1:
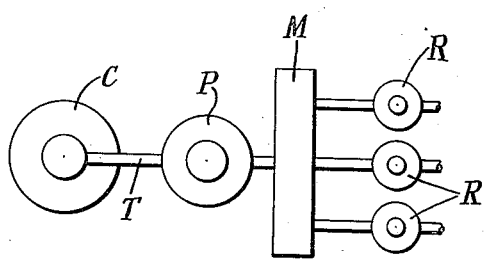
Fig. 1 is a diagrammatic view of an oxygen supply system embodying features of the invention.
Figure 3:
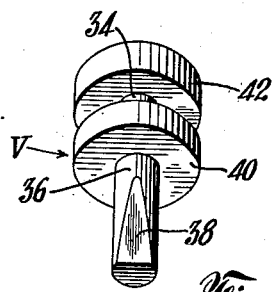
Fig. 3 is a perspective view of the valve stem forming part of the regulator shown in Fig. 2.

Referring to Fig. 1, the oxygen supply system illustrated comprises a source C of oxygen under high pressure, a conventional absolute pressure-controlled regulator P, a manifold M, a plurality of altitude-controlled regulators R, and suitable means connecting these elements, such as tubing T. The pressure regulator P may be of the type customarily used to reduce the pressure of fluids, stored under relatively high pressure, to a relatively low value. The inlet of regulator P is connected to the source C, such as a cylinder or container, in which the oxygen is stored under relatively high pressure, and the outlet of the regulator P is connected to the inlet of manifold M. The inlets of the individual altitude-controlled regulators R are connected by tubing T to the outlets of manifold M, and each regulator outlet is connected to a consuming device, such as an oxygen mask.

The regulator P reduces the oxygen pressure from the relatively high value (usually between 2000 and 2500 p. s. i.) at which it is stored in the container C to an intermediate value (between 25 and 100 p. s. i.) only slightly above that (between ½ and 20 p. s. i.) at which the oxygen is supplied to the consuming devices. The regulators R, which are described more fully hereinafter, reduce the oxygen pressure from this intermediate value to that required for the consuming devices. These regulators respond to changes in atmospheric pressure to vary the delivery pressure and rate of oxygen flow in accordance with changes in altitude. Due to the initial large reduction in the oxygen pressure by the regulator P as well as the relatively small volume of oxygen needed, the regultors R can be made smaller, more economical and more sensitive, as they need not withstand the high initial pressure of the oxygen and need be effective over a small range only of oxygen pressure.

Figure 2:
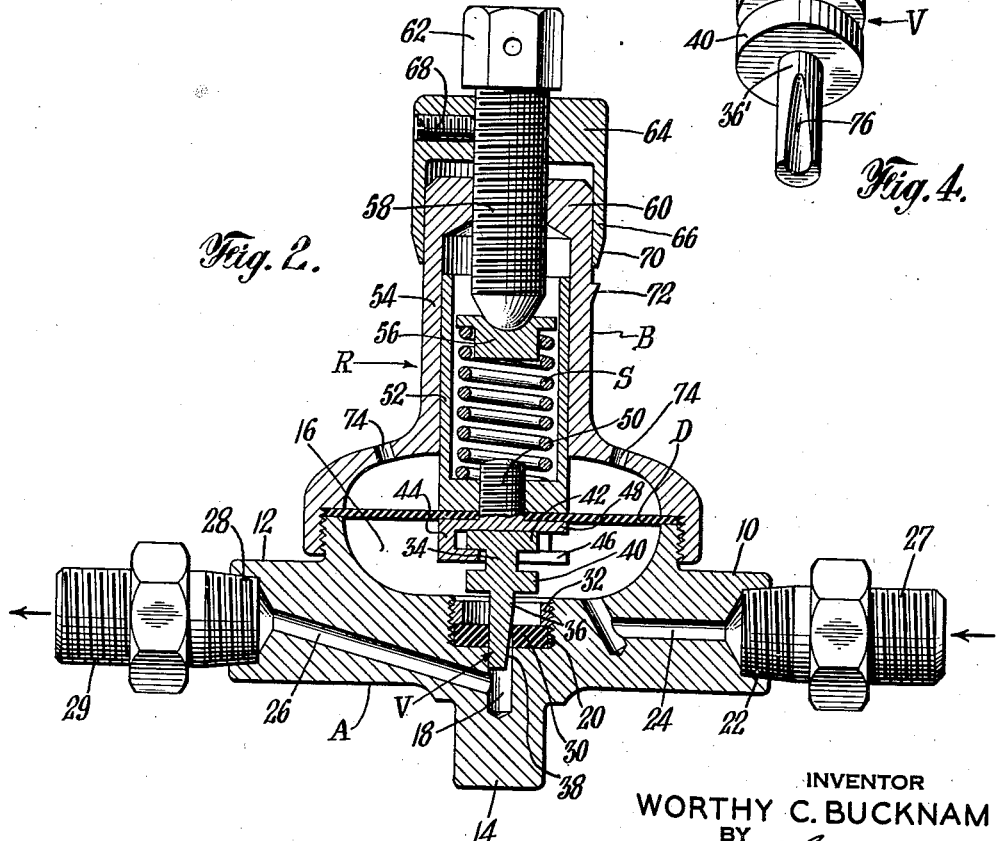
Fig. 2 is a cross-sectional view of an altitude-controlled regulator embodying features of the invention.

Referring to Fig. 2, each regulator R includes a valve housing or casing A, a spring housing or casing B, and atmospheric pressure-responsive means, such as a flexible diaphragm D, having its peripheral edge clamped between suitable flanges of the housings A and B. The flanges of housings A and B may be threadedly secured together, as shown. Housing A contains a valve V, controlling the flow of oxygen through the regulator R and detachably connected to the diaphragm D; while housing B contains a spring S operatively associated with diaphragm D and opposing the pressure of fluid thereagainst. The valve V is readily interchangeable with other valves so that the mathematical relationship between the rate of oxygen flow and the atmospheric pressure or altitude may be altered easily.

More particularly, housing A may be generally circular in form and include opposed bosses 10 and 12 and suitable mounting means, such as a lug 14. One side of housing A may be recessed to form an inlet chamber 16 closed by the diaphragm D, and drilled centrally to form a cylindrical outlet chamber 18 having an enlarged and threaded portion 20.

A threaded inlet recess 22 is formed in boss 10 and communicates with inlet chamber 16 through an inlet passage 24. Similarly, an outlet passage 26 connects outlet chamber 18 to a threaded outlet recess 28 in the boss 12. Recess 22 may receive a suitable inlet connection, such as a coupling 27 of the tubing T (Fig. 1) and recess 28 may be connected by suitable means, including a coupling 29, to an oxygen mask or other consuming device.

Communication between inlet chamber 16 and outlet chamber 18 is controlled by the valve V. This valve includes an annular valve seat or valving orifice 30, of a resilient material, such as soft rubber, seated in the enlarged portion 20 of chamber 18 and held in place by a threaded retaining ring 32. A valve stem 34 is displaceable axially of the valve seat or valving orifice 30 to vary the effective area of the orifice. For this purpose, valve stem 34 includes a substantially cylindrical portion 36 having a maximum cross-sectional area substantially equal to that of the opening in valve seat 30, which portion extends through the opening in valve seat 30 into outlet chamber 18 and has extensive sliding surface engagement with the wall of the chamber 18 throughout the range of movement of the valve, and formed with a tapered flat 38 extending at an inclination longitudinally of portion 36. The valve stem thus progressively varies in cross-sectional area throughout at least part of its length. Thus the effective area of the valving orifice 30 may be varied by axial displacement of the valve portion 36 therethrough, the maximum cross-sectional area of such portion 36 being substantially equal to the cross-sectional area of the valving orifice 30.

The end of stem 34 adjacent diaphragm D is formed with spaced circumferential flanges or annular ribs 40 and 42. The lower rib 40 forms a seating surface adapted at times to engage the valve seat 30 to interrupt communication between inlet chamber 16 and outlet chamber 18, and the upper rib 42 cooperates with means for detachably connecting stem 34 to diaphragm D. This means may comprise a member 44 having a bifurcated flange 46 engaging beneath rib or flange 42 on stem 34 and a second flange 48 engaging the diaphragm D. Member 44 includes a threaded stem 50 extending through diaphragm D and coacting with a threaded guide means 52 to produce a gas-tight seal with the diaphragm. The guide means 52 is elongated and cylindrical in form and has extensive sliding surface engagement with an elongated tubular extension 54 of the housing or casing B, the extension 54 being axially aligned with the cylindrical outlet chamber 18 and the valving orifice 30. The elongated cylindrical guide means 52 in cooperation with the elongated tubular extension 54 and the substantially cylindrical valve portion 36 in cooperation with said cylindrical outlet chamber 18 act to maintain the valve V in rigid, axial alignment with the valving orifice 30 throughout the effective range of movement of the valve V with respect to the valving orifice 30; and the bifurcated flange 46 engages the flange 42 on the valve V to maintain the valve in rigid parallelism with the guide means 52 while providing lateral adjustment of the valve V relative to the diaphragm D and guide means 52 to maintain the guide means 52 aligned with the tubular extension 54 and the valve V aligned with the cylindrical outlet chamber 18. As the valve stem 34 may be quickly and easily detached from the member 44, the stem may be readily interchanged with one of a different type to vary the mathematical relationship between the rate of oxygen flow and the altitude or atmospheric pressure. Additionally, the means 44 maintains the stem 34 in rigid parallelism with the guide means 52, while providing lateral adjustment of the stem 34 relative to the diaphragm D and the guide means 52 so that the guide means may be properly aligned with the tubular extension 54 and the stem 34 may be properly aligned with the cylindrical outlet chamber 18.

Seated within and engaging the inner end wall of the guide means 52 is the spring S, and the outer end of the spring engages a spring seat 56. To adjust the spring pressure, a bolt 58 is threaded through the end wall 60 of the extension 54 and engages the spring seat 56. Bolt 58 is provided with a squared operating head 62, and threaded on the bolt is a cylindrical member 64, having a skirt 66 extending downwardly along the external surface of the extension 54. Member 64 is secured against rotation on bolt 58 by a set screw 68, and the lower end of skirt 66 is bevelled as at 70. A suitable scale may be imprinted on or secured to the bevelled portion 70 for cooperation with a pointer or marker 72 on the extension 54. Apertures 74 are formed in the housing B whereby the spring engaging side of diaphragm D is subject to ambient atmospheric pressure.

The operation of the regulator R is as follows: Bolt 58 is turned to compress spring S an amount sufficient to maintain rib 40 in engagement with valve seat 30 until the altitude at which it is desired to begin oxygen delivery is attained. When this altitude is attained, the combined effect on diaphragm D of the ambient atmospheric pressure and the force of spring S will be insufficient to counterbalance the oxygen pressure in inlet chamber 16. The diaphragm will thereupon move the rib 40 out of engagement with the valve seat 30, and oxygen will flow from chamber 16 to chamber 18. As the diaphragm moves further in the same direction due to an increase in altitude, and consequent decrease in ambient atmospheric pressure, the flow of oxygen through the valve V will increase due to the increased valve opening provided by the tapered flat 38 on valve stem 34.

Figure 4:
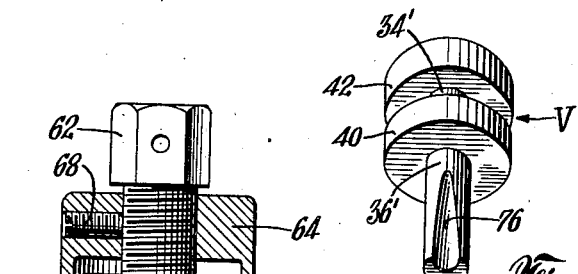
Fig. 4 is a perspective view of another form of valve stem which may be used with the regulator of Fig. 2.

It will be apparent that the ratio between the oxygen flow and the altitude may be altered readily by substituting for the stem 34, a similar stem having a tapered flat of a different degree of slope. An alternative form of valve stem, effective to control the oxygen flow in the same manner as stem 34, is illustrated in Fig. 4. The valve stem 34' therein illustrated includes a cylindrical portion 36' formed with a tapered groove 76.

By the provision of the diaphragm attaching member 44, the valve stem may be readily removed and a different valve stem installed, thus varying the mathematical ratio between the atmospheric pressure or altitude and the oxygen flow as desired. Similarly, the bolt 58 permits ready adjustment of the regulator to begin delivery of oxygen at any desired altitude, and the scale on skirt 66 in cooperation with pointer 72 permits ready adjustment of the regulator setting.

As the major portion of the oxygen pressure reduction occurs in the conventional regulator P, the individual regulators R need be constructed to withstand relatively low pressures only, thus decreasing their cost and simplifying their construction.

While specific embodiments of the invention have been illustrated and described in detail, it should be understood that such has been done only to exemplify the principles of the invention, which may be otherwise embodied within the scope of the appended claims.

What is claimed is:

1. An altitude-controlled regulator comprising, in combination, a valve casing formed with an inlet chamber and a cylindrical outlet chamber; means providing a valving orifice disposed between said chambers; a spring housing secured to said valve casing and formed with an elongated tubular extension axially aligned with said cylindrical outlet chamber and said valving orifice; a flexible pressure-responsive diaphragm clamped between said casing and said housing; an elongated cylindrical guide means having extensive sliding surface engagement with said tubular extension; a valve mounted on the opposite side of said diaphragm from said guide means and having a substantially cylindrical portion extending through said valving orifice and having extensive sliding surface engagement with the wall of said cylindrical outlet chamber throughout the range of movement of said valve, and with a circumferential flange, said cylindrical portion having a variable cross-sectional area whereby the effective area of said valving orifice may be varied by axial displacement of said portion therethrough and a maximum cross-sectional area substantially equal to the cross-sectional area of said valving orifice; said elongated cylindrical guide means in cooperation with said elongated tubular extension and said substantially cylindrical valve portion in cooperation with said cylindrical outlet chamber acting to maintain said valve in rigid, axial alignment with said valving orifice throughout the effective range of movement of said valve with respect to said valving orifice; and means securing said valve to said diaphragm, said means comprising a member secured to said diaphragm and to said guide means and formed with a bifurcated flange engaging the flange on said valve to maintain said valve in rigid parallelism with said guide means while providing lateral adjustment of said valve relative to said diaphragm and guide means to maintain said guide means aligned with said tubular extension and said valve aligned with said cylindrical outlet chamber.

2. In the combination claimed in claim 1, a spring disposed within said elongated cylindrical guide means and having one end engaging an end wall of said guide means adjacent said diaphragm; a spring seat within said guide means and engaging the opposite end of said spring; and a bolt threaded through the end wall of said elongated tubular extension and engaging said spring seat.

3. The combination claimed in claim 1, in which said substantially cylindrical portion of said valve is formed with a tapered flat extending at an inclination longitudinally thereof.

4. The combination claimed in claim 1, in which said substantially cylindrical portion of said valve is formed with a tapered groove extending longitudinally thereof.

5. The combination claimed in claim 1, in which said valve is formed with a seating surface adapted at times to engage said valving orifice to interrupt completely communication between said inlet and said outlet chambers.

WORTHY C. BUCKNAM.